(12) United States Patent
Jantsch et al.

(10) Patent No.: US 6,761,755 B2
(45) Date of Patent: Jul. 13, 2004

(54) COMPOSITE MEMBRANE AND PRODUCTION METHOD THEREFOR

(75) Inventors: Uwe Jantsch, Freigericht (DE); David Lupton, Gelnhausen (DE); Thomas Giesel, Erlensee (DE)

(73) Assignee: W. C. Heraeus GmbH & Co. KG, Hanau (DE)

( * ) Notice: Subject to any disclaimer, the term of this patent is extended or adjusted under 35 U.S.C. 154(b) by 0 days.

(21) Appl. No.: 10/408,409

(22) Filed: Apr. 7, 2003

(65) Prior Publication Data

US 2003/0213365 A1 Nov. 20, 2003

(30) Foreign Application Priority Data

May 17, 2002 (DE) ......................................... 102 22 568

(51) Int. Cl.[7] .................. B01D 53/22; B01D 69/12; B01D 71/02
(52) U.S. Cl. .................. 96/11; 95/56; 55/524; 55/DIG. 5
(58) Field of Search ........................... 95/55, 56, 4, 11; 55/524, DIG. 5

(56) References Cited

U.S. PATENT DOCUMENTS

| | | |
|---|---|---|
| 1,174,631 A | 3/1916 | Snelling |
| 2,773,561 A | 12/1956 | Hunter |
| 2,958,391 A | 11/1960 | Derosset et al. |
| 3,350,846 A | 11/1967 | Makrides et al. |

(List continued on next page.)

FOREIGN PATENT DOCUMENTS

| | | |
|---|---|---|
| EP | 0 242 208 B1 | 7/1991 |
| EP | 0 348 041 B1 | 8/1992 |
| EP | 0 718 031 | 6/1996 |
| EP | 0 783 919 A1 | 7/1997 |
| JP | 4-346824 A | 12/1992 |
| JP | 5-76737 A | 3/1993 |
| JP | 5-76738 A | 3/1993 |
| JP | 5-285357 A | 11/1993 |
| SU | 1058587 A | 12/1983 |
| WO | WO 90/09231 A1 | 8/1990 |
| WO | WO 99/33545 A1 | 7/1999 |

OTHER PUBLICATIONS

Hsieh, "Inorganic Membrane Reactors", *Catal. Rev.—Sci. Eng.*, vol. 33 (1&2), pp. 1–70, (1991).

Collins et al., "Preparation and Characterization of a Composite Palladium–Ceramic", *Ind. Eng. Chem. Res.*, vol. 32, No. 12, pp. 3006–3013, (1993).

Hughes et al., "Hydrogen Diffusion Membranes based on some Palladium–Rare Earth Solid Solution Alloys", *Zeitschrift für Physikalische Chemie Neue Folge*, vol. 117, pp. 185–193 (1979).

(List continued on next page.)

*Primary Examiner*—Robert H. Spitzer
(74) *Attorney, Agent, or Firm*—Akin Gump Strauss Hauer & Feld, LLP

(57) ABSTRACT

A composite membrane is provided having a flexible metallic substrate for separation of hydrogen from gas mixtures, which achieves a separation ratio of hydrogen to nitrogen of greater than about 4,000 at operating temperatures higher than 300° C. The composite membrane has a layer system arranged on at least one surface of the substrate, the layer system having a rigid, non-self-supporting, nonmetallic inorganic diffusion barrier layer adjacent the substrate, and at least one hydrogen-permeable, nonporous, metallic membrane on the side of the barrier facing away from the substrate. A method for production of such a composite membrane is also provided in which the diffusion barrier layer adjoining the membrane layer is formed by PVD, CVD, sol-gel process, or sintering-on powder particles, and the membrane layer is electrodeposited on the diffusion barrier layer.

50 Claims, 1 Drawing Sheet

U.S. PATENT DOCUMENTS

| | | | |
|---|---|---|---|
| 3,393,098 A | | 7/1968 | Hartner et al. |
| 3,413,777 A | * | 12/1968 | Langley et al. ................. 96/11 |
| 3,428,476 A | * | 2/1969 | Langley et al. ............. 427/229 |
| 3,477,288 A | | 11/1969 | Gottwaldov et al. |
| 3,622,303 A | | 11/1971 | Hill |
| 4,388,479 A | | 6/1983 | Gryaznov et al. |
| 4,468,235 A | | 8/1984 | Hill |
| 4,496,373 A | | 1/1985 | Behr et al. |
| 4,699,637 A | | 10/1987 | Iniotakis et al. |
| 5,094,927 A | | 3/1992 | Baucke et al. |
| 5,139,541 A | * | 8/1992 | Edlund .......................... 95/56 |
| 5,217,506 A | * | 6/1993 | Edlund et al. ................. 95/56 |
| 5,259,870 A | | 11/1993 | Edlund |
| 5,393,325 A | | 2/1995 | Edlund |
| 5,498,278 A | * | 3/1996 | Edlund .......................... 96/11 |
| 5,645,626 A | * | 7/1997 | Edlund et al. ................. 95/56 |
| 5,782,959 A | * | 7/1998 | Yang et al. .................... 96/11 |
| 5,980,989 A | * | 11/1999 | Takahashi et al. .......... 427/294 |
| 5,989,319 A | * | 11/1999 | Kawae et al. .................. 96/11 |
| 6,183,542 B1 | * | 2/2001 | Bossard ......................... 96/11 |
| 6,214,090 B1 | * | 4/2001 | Dye et al. ...................... 95/56 |
| 6,379,524 B1 | | 4/2002 | Lee et al. |
| 6,419,726 B1 | * | 7/2002 | Frost et al. .................... 95/56 |
| 2002/0020298 A1 | | 2/2002 | Drost et al. |
| 2002/0078827 A1 | * | 6/2002 | Thornton ....................... 96/11 |
| 2002/0124723 A1 | * | 9/2002 | Frost et al. .................... 95/56 |

OTHER PUBLICATIONS

Banerjee et al., "Influence of the sputtering gas on the preferred orientation of nanocrystalline titanium nitride thin films", *Thin Solid Films*, vol. 405, pp. 64–72, (2002).

Shu et al., "Structrually stable composite Pd–Ag alloy membranes: Introduction of a diffusion barrier", *Thin Solid Films*, vol. 286, pp. 72–79, (1996).

* cited by examiner

COMPOSITE MEMBRANE AND PRODUCTION METHOD THEREFOR

BACKGROUND OF THE INVENTION

The invention relates to a composite membrane with a flexible, metallic substrate and a layer system arranged on at least one surface of the substrate; the layer system being formed of a rigid, non-self-supporting, nonmetallic inorganic diffusion barrier layer and at least one hydrogen-permeable, nonporous, metallic membrane layer; and the diffusion barrier layer being arranged between the substrate and the at least one membrane layer and being formed by at least one single layer. The invention further relates to a method for the production of such a composite membrane.

Such membranes are known, for example, from European published patent applications EP 783 919 A1. A composite membrane is disclosed therein which has a support of hydrogen-permeable metal or hydrogen-permeable ceramic, wherein the support can be flexible as well as rigid. The support can be made porous, using a fabric of stainless steel. A porous, flexible diffusion barrier layer, which consists of a non-sintered material, such as felt, paper or fiber mats, is situated on this support. It is further disclosed that a rigid diffusion barrier layer can also be used, if the hydrogen-permeable membrane layer arranged above it is textured. Oxides, sulfides, nitrides, carbides and silicides are disclosed as materials for a rigid diffusion barrier layer. It is indicated that these rigid diffusion barrier layers frequently have cracks. The hydrogen-permeable membrane layer arranged over the diffusion barrier layer is textured when a rigid diffusion barrier layer is used, while this is not absolutely required when a porous, flexible diffusion barrier layer is used. The membrane layer is formed from metals of Group VIIb or VIIIb, the metals Fe, Mn, Ni, Pd, Pt and Ru being specifically mentioned here. The hydrogen-permeable membrane layer can be formed, for example, by electrodeposition on the porous, flexible diffusion barrier layer. The textured membrane layer required on the diffusion barrier layer is constituted as a self-supporting, shaped metal sheet for forming the composite membrane.

U.S. Pat. No. 5,393,325 describes a composite membrane with a nonporous, hydrogen-permeable, metal support, on which a non-metallic diffusion barrier layer is arranged. Disclosed therein as materials for the diffusion barrier layer are oxides, sulfides, carbides, nitrides or silicides. Aluminum oxide, lanthanum oxide, molybdenum oxide, silicon dioxide, tungsten oxide, yttrium oxide and vanadium sulfide are mentioned as preferred materials. A non-porous, hydrogen-permeable metallic layer of, for example, Pd, Pt, Fe, Ru, Ni or Mn is arranged on the diffusion barrier layer.

International patent application publication WO 99/33545 discloses a support structure of porous stainless steel, whose surface is sintered with a fine nickel powder. The thus pretreated surface is electroplated with copper and then provided with a further electroplated layer of a hydrogen-permeable metallic alloy as, e.g., a palladium alloy.

European Patent EP 0 348 041 B1 describes a composite membrane with an inorganic support of fibers, whose fiber interstices have a diameter>5 $\mu$m and a length smaller than ten times the diameter. The inorganic support is coated with a porous, inorganic film, which is made of non-metallic, sintered particles and has a pore size of up to 2 $\mu$m. Glass, mineral, or metal fiber materials are disclosed therein as the support materials. For the porous, inorganic film, there are proposed metal oxides, for example, titanium dioxide, aluminum oxide, cerium oxide, zirconium dioxide, mullite, or mixtures thereof. It is mentioned that cracks can appear in the porous, inorganic film due to bending of the membrane.

U.S. Pat. No. 4,468,235 discloses a hydrogen-permeable membrane with a nonporous support made of a titanium alloy, which is coated with a metal or metallic alloy of the group of palladium, nickel, cobalt, iron, vanadium, niobium, or tantalum. This coating is produced on the support by electroplating or by sputtering.

International patent application publication WO 90/09231 describes a hydrogen-permeable membrane with an inorganic support having gaps, wherein the gaps are bridged over by a composite layer of nonmetallic particles and metal. Palladium is disclosed here as the metal.

JP 346824/92 and JP 76738/93 disclose a hydrogen-permeable membrane made of palladium on a porous metallic support, wherein a ceramic barrier layer or a metal oxide barrier layer is arranged between the membrane and the metallic support.

U.S. Pat. No. 5,259,870 describes a hydrogen-permeable composite membrane with a support made of nonporous metal, a diffusion barrier layer made of a metal oxide, and a membrane layer made of palladium or palladium alloy.

Russian Patent RU 1,058,587 discloses a hydrogen-permeable membrane with a metal support, which is bonded by diffusion welding to a layer of palladium or palladium alloy. Ultra-fine metal oxide powder is arranged between the metal support and the layer of palladium or palladium alloy.

Further hydrogen-permeation membranes are known from U.S. Pat. Nos. 4,496,373; 5,094,927; 3,958,391; 3,477,288; 4,699,637; 4,388,479; 3,622,303; 3,350,846; 1,174,631; 2,773,561; and 3,393,098, and European Patent EP 0 242 208 B1, and also the publications H. P. Hsieh, "Inorganic Membrane Reactors," *Catal. Rev.—Sci. Eng.*, 33(1&2):1–70 (1991); J. P. Collins and J. D. Way, "Preparation and Characterization of a Composite Palladium-Ceramic Membrane," *Ind. Eng. Chem. Res.*, 32(12):3006–3013 (1993); and D. T. Hughes and I. R. Harris, "Hydrogen Diffusion Membranes based on some Palladium-Rare Earth Solid Solution Alloys," *Zeitschrift für Physik. Chemie Neue Folge*, 117:185–193 (1979).

BRIEF SUMMARY OF THE INVENTION

The problem is posed of providing an effective composite membrane for separating hydrogen from gas mixtures which attains a separation ratio of hydrogen to nitrogen of greater than about 4,000 at operating temperatures of greater than 300° C.

The separation ratio is determined by separate determinations of the throughflow rates for pure nitrogen and pure hydrogen through the composite membrane, and gives the selectivity of the membrane. The respective volume flows of permeate through the composite membrane are measured. The ratio of the volume flows $H_2/N_2$ is above all a measure of the imperviousness of the membrane or for the number of undesired pores and defective places in the membrane layer. For example, a $H_2/N_2$ value<about 500 shows that the separating action of the membrane is small and the number of pores or defective places in the membrane layer is high.

The problem is solved in that at least the single layer of the diffusion barrier layer directly adjoining the membrane layer is open-pored and/or has microcracks and on its surface facing away from the substrate has an electrical resistivity of less than about 10 $\Omega$cm at a temperature of 20° C., and wherein the substrate has an open porosity in a range of about 15% to 60% and the at least one membrane layer is electrodeposited on the surface of the at least one diffusion barrier layer facing away from the substrate. By a rigid diffusion barrier layer is understood a brittle, compact layer, firmly adherent to the substrate, which can consist of plural individual layers. Due to the surface of the diffusion barrier layer facing away from the substrate having a low resistivity of less than about 10 Ωcm, a closed membrane layer can be electrodeposited on this surface. It is thus possible to use a multi-layer diffusion barrier layer, which can, for example, also contain electrically insulating single layers, as long as the single layer of the diffusion barrier layer directly adjoining the membrane layer has this low resistivity. If the diffusion barrier layer also has nonporous or crack-free individual layers, these must be formed of a hydrogen-permeable material.

The composite membrane according to the invention has a high permeability for hydrogen, such that a separation ratio of hydrogen to nitrogen of greater than about 4,000 is attained. The composite membranes of the invention are particularly useful, for example, for separating hydrogen from the exhaust gas of fuel cells, which are fed with hydrogen or methane.

Although a rigid structure is conceived for the diffusion barrier layer, which can already have microcracks before the formation of the membrane layer, the finished composite membrane is, surprisingly, not unusable when it is slightly bent. The composite membrane according to the invention is furthermore insensitive to thermally induced mechanical stresses, such as may arise, for example, during a temperature change from room temperature to about 400° C.

It is particularly preferred when the single layer of the diffusion barrier layer which is directly adjacent to the membrane layer has, on its surface facing away from the substrate, an electrical resistivity of less than about 10,000 $\mu\Omega$cm at a temperature of 20° C., particularly less than about 1,000 $\mu\Omega$cm. The membrane layer is thereby homogeneously deposited.

Stainless steel has been found to be suitable as the material for the flexible substrate.

The single layer of the diffusion barrier layer directly adjoining the membrane layer is preferably formed from a metal nitride. Here, the metal nitrides with at least one metal of the group of titanium, zirconium, hafnium, vanadium, niobium, tantalum, chromium, molybdenum and tungsten are particularly preferred. Metal nitrides have a low electrical resistivity and can be electroplated directly with the membrane layer. Titanium nitride has been found to be particularly suitable here. Besides the metals titanium, zirconium, hafnium, vanadium, niobium, tantalum, chromium, molybdenum and tungsten, the metal nitride can additionally contain aluminum.

Furthermore, it has proved effective when the single layer of the diffusion barrier layer directly adjoining the membrane layer is formed from a metal oxide. In particular, substoichiometric metal oxides are preferred here, which have an especially good electrical conductivity. A substoichiometric titanium oxide has proved to be particularly effective here. Furthermore, the noble metal oxides: ruthenium oxide ($RuO$, $RuO_2$ or $Ru_2O_3$), or iridium oxide ($IrO$, $IrO_2$ or $Ir_2O_3$) are preferred. The use of rhodium oxide ($RhO$ or $Rh_2O_3$) has also proved effective. These noble metal oxides have a low electrical resistivity, so that a direct application of the membrane layer by electroplating is possible.

It has furthermore proved effective to form the single layer of the diffusion barrier layer directly adjoining the membrane layer from a metal carbide. Here, metal carbides with at least one metal of the group of titanium, zirconium, hafnium, vanadium, niobium, tantalum, chromium, molybdenum and tungsten have proved effective. These metal carbides have a low electrical resistivity and can be directly electroplated with the membrane layer. Particularly preferred in this connection is tungsten carbide. The metal carbide can here contain included carbon, which does not impair its function.

It has furthermore proved effective when the single layer of the diffusion barrier layer directly adjoining the membrane layer is formed of a metal oxynitride. Here, a metal oxynitride is preferred with at least one metal from the group of titanium, zirconium and hafnium, which can be directly electroplated with the membrane layer. Titanium oxynitride is particularly preferred here. Besides the at least one metal of the group of titanium, zirconium and hafnium, the metal oxynitride may also contain aluminum.

Furthermore, it has proved effective if the single layer of the diffusion barrier layer directly adjoining the membrane layer is formed of a metal carbonitride. The metal carbonitrides which can be electroplated directly with the membrane layer, and which are formed with at least one metal of the group of vanadium, niobium, tantalum, chromium, molybdenum and tungsten, have proved particularly effective here. Titanium carbonitride is particularly preferred here. Niobium carbonitrides ($NbC_xN_y$), such as $NbC_{0.3}N_{0.7}$, are also suitable.

Furthermore, it has proved effective when the single layer of the diffusion barrier layer directly adjoining the membrane layer is formed of a metal boride. Suitable metal borides which can be electroplated directly with the membrane layer are, for example, formed with at least one metal of the group of niobium, titanium, zirconium, cerium and barium. Particularly preferred here are cerium hexaboride ($CeB_6$), titanium diboride ($TiB_2$), and also niobium boride ($NbB$) or niobium diboride ($NbB_2$).

The flexible metallic substrate is preferably formed of metal fibers, wherein the interstices between the metal fibers have a width and length, respectively, of <about 5 $\mu$m, or the free hole surfaces between the metal fibers have a round surface equivalent with a diameter of <about 5 $\mu$m. The substrate can here be formed of a woven fabric, felt, or non-woven fabric. Instead, the substrate can also be formed from a foil which has been produced from sintered metal powder.

In order to facilitate the deposition of the diffusion barrier layer, it is preferred to partially fill the interstices or open pores on the side of the substrate facing the diffusion barrier layer with metal particles, or a mixture of metal particles with ceramic particles, or a mixture of metal particles with glass particles, or a mixture of metal particles with ceramic and glass particles, which become sintered to the metal fibers or to the foil. The pore structure in the surface region is thereby finer and the surface smoother. In addition, the thus treated substrate can be subjected to a rolling process before or after sintering, in order to completely flatten the surface.

An open porosity formed by pores with a pore diameter of about 20 nm to 500 nm is preferred, at least for the single layer of the diffusion barrier layer directly adjoining the membrane layer. It is furthermore preferred that at least the single layer of the diffusion barrier layer directly adjoining the membrane layer have microcracks, wherein the width of the microcracks is <about 5 $\mu$m.

At least for the single layer of the diffusion barrier layer directly adjoining the membrane layer, production by physical vapor phase deposition (PVD), particularly by cathode sputtering, is preferred. Furthermore, formation by chemical vapor phase deposition (CVD) or by a sol-gel process has also proved effective. Furthermore, at least the single layer of the diffusion barrier layer directly adjoining the membrane layer can be formed by particles with an average particle size<about 0.5 $\mu$m, which are sintered together. Any method is suitable in order to form a nonmetallic, inorganic diffusion barrier layer which is rigid, non-self-supporting, open-pored and/or has microcracks, and which is brittle, compact, and well-bonded to the substrate.

The preferred thickness of the single layer of the diffusion barrier layer directly adjoining the membrane layer is in a range of about 0.1 $\mu$m to 5 $\mu$m.

Furthermore, the diffusion barrier layer can be covered on the surface facing away from the substrate with a seed layer, whose chemical composition at least partially corresponds to that of the membrane layer. Here, the seed layer need not necessarily be a closed layer, but instead can be composed of individual material islands which have no connections. By such a seed layer, the electrodeposition of the membrane layer can be accelerated, and at the same time made more uniform, and its adhesion to the diffusion barrier layer can be improved.

The at least one membrane layer is preferably formed of palladium or a palladium alloy. Particularly suitable here are also the palladium alloys Pd-8 atomic % Cd, Pd-8 atomic % Y, Pd-5.7 atomic % Ce, or Pd-25 atomic % Ag. Instead, any other hydrogen-permeable, closed metallic layer is suitable as the membrane layer.

A thickness in the range of about 0.5 $\mu$m to 15 $\mu$m is preferred for the at least one membrane layer.

The at least one membrane layer can be covered with catalytically active material on its surface facing away from the at least one diffusion barrier layer. Platinum, ruthenium and rhodium are particularly preferred here as catalytically active materials. Instead, the catalytically active alloys of platinum-palladium, ruthenium-palladium, rhodium-palladium, or palladium-rare earth metal have proved to be effective.

The problem is solved for the method in that at least the single layer of the diffusion barrier layer directly adjoining the membrane layer is formed by means of PVD, CVD, a sol-gel process, or by sintering-on powder particles with a particle size<about 0.5 $\mu$m, and that subsequently the at least one membrane layer is electrodeposited on the surface of the diffusion barrier layer facing away from the substrate.

The production of suitable single layers, adjoining the membrane layer and being open-pored and/or having microcracks, by cathode atomization or sputtering is known, for example, for TiN layers, from the publication R. Baneree, R. Chandra, and P. Ayyub, "Influence of the sputtering gas on the preferred orientation of nanocrystalline titanium nitride thin films," *Thin Solid Films*, 405:64–72 (2002).

The surface of the diffusion barrier layer facing away from the substrate is preferably covered with a seed layer whose chemical composition at least partially corresponds to that of the membrane layer. The deposition of the membrane layer can thereby be accelerated and made more uniform, and its adhesion to the diffusion barrier layer can be improved.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
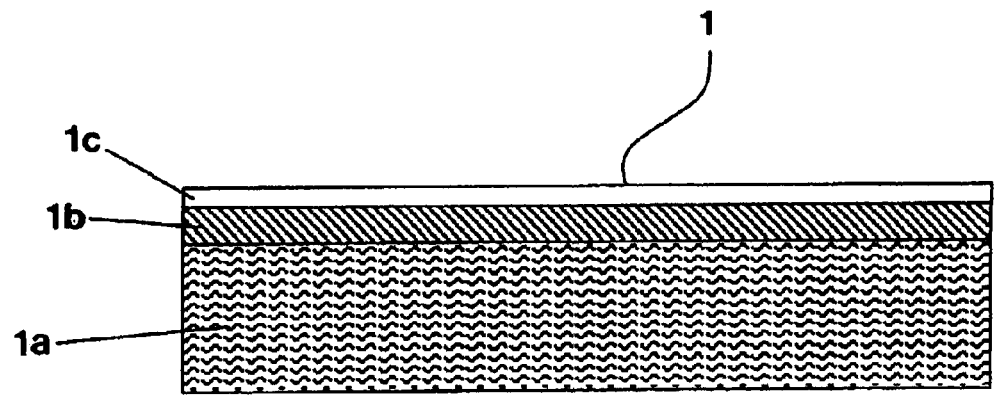
FIG. 1 is a cross-sectional side view of a composite membrane according to the invention.

FIG. 1 shows a composite membrane 1 which is composed of a flexible, metallic substrate 1a, a rigid, non-self-supporting, nonmetallic, inorganic diffusion barrier layer 1b, and a hydrogen-permeable, nonporous, metallic membrane layer 1c of palladium. The diffusion barrier layer 1b can here be formed from several single layers, wherein at least the single layer of the diffusion barrier layer 1b directly adjoining the membrane layer 1c is open-pored and/or has microcracks, and at its surface facing away from the substrate 1a has an electrical resistivity of less than about 10 $\Omega$cm at a temperature of 20° C. The membrane layer 1c is electrodeposited on this conductive surface. If the diffusion barrier layer also has nonporous or crack-free single layers, these must be formed of a hydrogen-permeable material.

Figure 2:
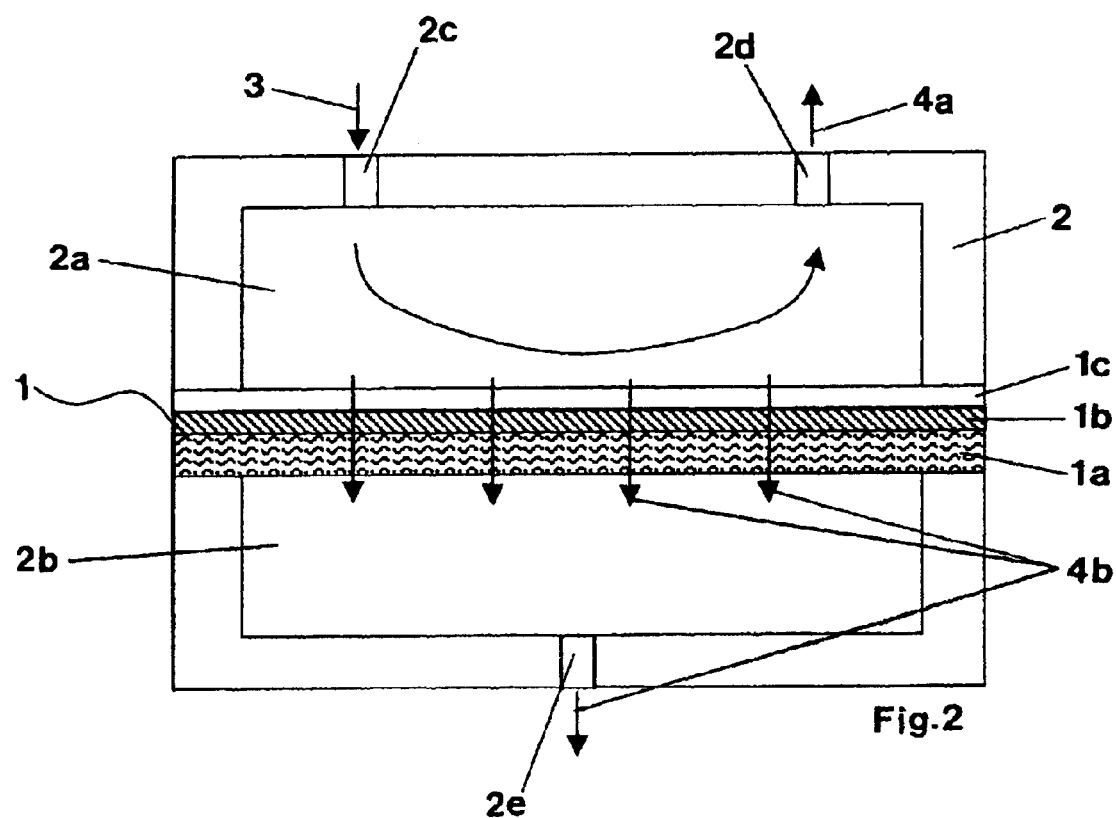
FIG. 2 is a cross-sectional side view of a measuring device for the determination of membrane properties.

FIG. 2 shows a composite membrane 1 with the substrate 1a, the diffusion barrier layer 1b and the membrane layer 1c, wherein the composite membrane divides the interior of a measuring device 2 into two chambers 2a, 2b. The first chamber 2a of the measuring device 2, which is arranged on the side of the membrane layer 1c, has an inlet opening 2c for a gas 3 to be separated. The gas 3 flows to the composite membrane 1, where the gas fraction 4b (permeate) of the gas 3, for which the composite membrane 1 is permeable, passes through the composite membrane 1 into the second chamber 2b. The remaining gas 4a escapes through an outlet opening 2d, while the permeate 4b is drawn off through an opening 2e from the second chamber 2b.

The following examples 1–5 are to clarify in exemplary fashion the production of a composite membrane according to the invention. Finally, Table 1 shows the hydrogen permeation rates of these composite membranes, determined at different temperatures in a measuring device according to FIG. 2.

EXAMPLE 1

For the production of a composite membrane 1 an open-pored substrate 1a of stainless steel, 0.3 mm thick, was cleaned and coated on one side with a suspension which contained nickel powder having a particle size of <1 $\mu$m, in order to fill large pores and to smooth out unevenness of the surface of the substrate 1a. The nickel powder was sintered with the substrate 1a for about 1 hour at 600° C. to adhere firmly. The thus treated, cooled substrate 1a was then cleaned of still loose nickel particles in an ultrasonic bath. A diffusion barrier layer 1b made of TiN was next applied to the treated surface of the substrate in a thickness of 2 $\mu$m by cathode sputtering. The diffusion barrier layer 1b, consisting of only a single layer, was next directly electroplated with a 4 $\mu$m thick membrane layer 1c of palladium on the electrically conductive surface facing away from the substrate 1a. The electrodeposition of the palladium took place from an alkaline electrolyte. The composite membrane 1 was then boiled in distilled water for about 10 min., in order to remove residues of electrolyte.

The separating behavior of this composite membrane 1 was determined by separate determination of the nitrogen and hydrogen throughflow rates in the measuring device 2 according to FIG. 2. For this purpose, the composite membrane 1 was exposed on the side of the membrane layer 1c, once to pure hydrogen and once to pure nitrogen (for pressure conditions, see description in Table 1), and the volume flow of permeate 4b through the composite membrane 1 was respectively measured. The ratio of the volume flows $H_2/N_2$ is above all a measure of the impermeability of the membrane layer 1c or of the number of undesired pores and defects in the membrane layer 1c. A value of $H_2/N_2<500$ shows, for example, that the separating action of the composite membrane is small, and that the number of pores or defects in the membrane layer is high.

The $H_2/N_2$ ratio for this composite membrane had a value of >5,500 at 300° C. and a value of >8,000 at 450° C., which permits concluding that the separation behavior is optimum.

EXAMPLE 2

For the production of a composite membrane 1, as in Example 1, an open-pored substrate 1a of stainless steel, 0.3 mm thick, was cleaned and coated on one side with a suspension, which contained nickel powder with a particle size of <1 μm, in order to fill large pores and to smooth out unevenness of the surface of the substrate 1a. The nickel powder was sintered with the substrate 1a for about 1 hour at 600° C. to adhere firmly. The thus treated, cooled substrate 1a was then cleaned of still loose nickel particles in an ultrasonic bath. A diffusion barrier layer 1b made of TiN was next applied in a thickness of 2 μm by cathode sputtering. The diffusion barrier layer 1b, consisting only of a single layer, was covered on the electrically conductive surface facing away from the substrate 1a by an impregnation process with palladium seeds which did not form a closed layer but were present in islands. The seeded surface of the diffusion barrier layer 1b was next directly electroplated with a membrane layer 1c of palladium, 4 μm thick. The electrodeposition of the palladium took place from an alkaline electrolyte. The composite membrane was then boiled in distilled water for about 10 min., in order to remove residues of electrolyte.

EXAMPLE 3

For the production of a composite membrane 1 an open-pored substrate 1a of stainless steel, 0.25 mm thick, was cleaned. An aluminum oxide sol (e.g., Nyacol AL20® of the PQ Corporation) was applied to the substrate 1a on one side to form a diffusion barrier layer 1b consisting of two single layers, in order to fill large pores and to smooth out unevenness of the surface of the substrate 1a. The substrate 1a was dried and tempered for about 2 hours at 650° C., so that a scratchproof aluminum oxide layer was formed as the first single layer of the diffusion barrier layer 1b. To finish the diffusion barrier layer 1b, a second single layer of TiN, 2 μm thick, was then applied by cathode sputtering to the first single layer of aluminum oxide on the side facing away from the substrate 1a. The electrically conducting surface of the diffusion barrier layer 1b facing away from the substrate 1a or the second single layer was next directly electroplated with a membrane layer 1c of palladium, 5.5 μm thick. The electrodeposition of the palladium took place from an alkaline electrolyte. The composite membrane 1 was then boiled in distilled water for about 10 min., in order to remove residues of electrolyte.

The separating behavior of this composite membrane was determined (see Example 1) by separate determination of the nitrogen and hydrogen throughflow rates. The $H_2/N_2$ ratio had a value of 4,500 at 300° C. and a value of >7,000 at 400° C.

EXAMPLE 4

For the production of a composite membrane 1 an open-pored substrate 1a of stainless steel, 0.25 mm thick, was cleaned in an ultrasonic bath, and was coated on one side by screen printing with a paste, which contained nickel powder having a particle size of ≦1 μm and also an aluminum oxide sal (e.g., Nyacol AL20®). The paste was produced by mixing the nickel powder with a small amount of 2-propanol and was homogenized for about 3 min. in an ultrasonic bath. Thereafter, aluminum oxide sol was mixed in, and a screen printing paste was produced by stirring in some $HNO_3$. Large pores of the substrate 1a were filled, and unevenness of the surface of the substrate 1a was smoothed out. After drying the paste, the nickel-aluminum oxide layer (which, because of the metallic fraction, is to be counted as substrate and not as diffusion barrier layer) and the substrate 1a were sintered at 600° C. for about 2 hours, for firm adhesion. A diffusion barrier layer 1b of TiN, 1.5 μm thick, was next applied by cathode sputtering to the thus-treated surface of the substrate 1a.

The diffusion barrier layer 1b was covered on the electrically conductive surface facing away from the substrate 1a by an impregnation process with palladium seeds, which did not form a closed layer but were present in islands. The seeded surface of the diffusion barrier layer 1b was then directly electroplated with a membrane layer 1c of palladium, 6.5 μm thick. The electrodeposition of the palladium took place from an alkaline electrolyte. The composite membrane was then boiled in distilled water for about 10 min., in order to remove residues of electrolyte.

The separating behavior of this composite membrane was determined (see Example 1) by separate determination of the nitrogen and hydrogen throughflow rates. The $H_2/N_2$ ratio had a value of 6,000 at 300° C. and a value of >8,000 at 400° C.

EXAMPLE 5

For the production of a composite membrane 1 an open-pored substrate 1a of stainless steel, 0.3 mm thick, was cleaned. A diffusion barrier layer 1b of substoichiometric $IrO_{0.7}$ was then applied to the cleaned surface of the substrate 1a in a thickness of 1.5 μm by cathode sputtering. The diffusion barrier layer 1b, consisting of only a single layer, was next directly electroplated on the electrically conductive surface facing away from the substrate 1a with a 6 μm thick membrane layer 1c of palladium-silver alloy containing 25 wt. % Ag. The composite membrane 1 was then boiled in distilled water for about 10 min., in order to remove residues of electrolyte.

The separating behavior of this composite membrane was determined (see Example 1) by separate determination of the nitrogen and hydrogen throughflow rates. The $H_2/N_2$ ratio for this composite membrane had a value of 6,000 at 300° C. and a value of >8,000 at 400° C., which permits concluding that the separation behavior is optimum.

The following Table 1 shows the hydrogen permeation rates (under standard conditions) of the composite membranes from examples 1, 3, 4 and 5 after 50 hours of operation at different temperatures, wherein the gas pressure of the gas 3 to be separated had a value of 4 bar (absolute), and the gas pressure of the permeate 4b had a value of 1 bar (absolute). The surface area of the tested composite membrane was 10 cm² respectively.

TABLE 1

| Temperature (° C.) | H₂ Permeation Rate (m³/m²h) | | | |
|---|---|---|---|---|
| | Example 1 | Example 3 | Example 4 | Example 5 |
| 300 | 51 | 32 | 24 | 72 |
| 400 | 85 | 54 | 42 | 81 |
| 450 | 98 | — | — | — |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A composite membrane, comprising a flexible, metallic substrate and a layer system arranged on at least one surface of the substrate, wherein the layer system comprises a rigid, non-self-supporting, nonmetallic inorganic diffusion barrier layer and at least one hydrogen-permeable, nonporous, metallic membrane layer, wherein the diffusion barrier layer is arranged between the substrate and the at least one membrane layer and comprises at least one single layer, wherein at least a single layer of the diffusion barrier layer directly adjoining the membrane layer is open-pored and/or has microcracks and has an electrical resistivity of less than about 10 Ωcm at a temperature of 20° C. on its surface facing away from the substrate, wherein the substrate has an open porosity in a range of 15% to 60%, and wherein the at least one membrane layer is electrodeposited on the surface of the at least one diffusion barrier layer facing away from the substrate.

2. The composite membrane according to claim 1, wherein the single layer of the diffusion barrier layer directly adjoining the membrane layer has an electrical resistivity of less than about 10,000 μΩcm at a temperature of 20° C. on its surface facing away from the substrate.

3. The composite membrane according to claim 1, wherein the single layer of the diffusion barrier layer directly adjoining the membrane layer has an electrical resistivity of less than about 1,000 μΩcm at a temperature of 20° C. on its surface facing away from the substrate.

4. The composite membrane according to claim 1, wherein the substrate comprises stainless steel.

5. The composite membrane according to claim 1, wherein the single layer of the diffusion barrier layer directly adjoining the membrane layer comprises a metal nitride.

6. The composite membrane according to claim 5, wherein the metal nitride comprises at least one metal selected from the group consisting of titanium, zirconium, hafnium, vanadium, niobium, tantalum, chromium, molybdenum and tungsten.

7. The composite membrane according to claim 6, wherein the single layer of the diffusion barrier layer directly adjoining the membrane layer comprises titanium nitride (TiN).

8. The composite membrane according to claim 6, wherein the metal nitride further comprises aluminum.

9. The composite membrane according to claim 1, wherein the single layer of the diffusion barrier layer directly adjoining the membrane layer comprises a metal oxide.

10. The composite membrane according to claim 9, wherein the metal oxide has a substoichiometry.

11. The composite membrane according to claim 10, wherein the metal oxide comprises a substoichiometric titanium oxide.

12. The composite membrane according to claim 9, wherein the single layer of the diffusion barrier layer directly adjoining the membrane layer comprises ruthenium oxide (RuO or $RuO_2$ or $Ru_2O_3$).

13. The composite membrane according to claim 9, wherein the single layer of the diffusion barrier layer directly adjoining the membrane layer comprises iridium oxide (IrO or $IrO_2$ or $Ir_2O_3$).

14. The composite membrane according to claim 9, wherein the single layer of the diffusion barrier layer directly adjoining the membrane layer comprises rhodium oxide (RhO or $Rh_2O_3$).

15. The composite membrane according to claim 1, wherein the single layer of the diffusion barrier layer directly adjoining the membrane layer comprises a metal carbide.

16. The composite membrane according to claim 15, wherein the metal carbide comprises at least one metal selected from the group consisting of titanium, zirconium, hafnium, vanadium, niobium, tantalum, chromium, molybdenum and tungsten.

17. The composite membrane according to claim 16, wherein the single layer of the diffusion barrier layer directly adjoining the membrane layer comprises tungsten carbide (WC).

18. The composite membrane according to claim 15, wherein the metal carbide contains included carbon.

19. The composite membrane according to claim 1, wherein the single layer of the diffusion barrier layer directly adjoining the membrane layer comprises a metal oxynitride.

20. The composite membrane according to claim 19, wherein the metal oxynitride comprises at least one metal selected from the group consisting of titanium, zirconium and hafnium.

21. The composite membrane according to claim 20, wherein the single layer of the diffusion barrier layer directly adjoining the membrane layer comprises titanium oxynitride.

22. The composite membrane according to claim 20, wherein the metal oxynitride further comprises aluminum.

23. The composite membrane according to claim 1, wherein the single layer of the diffusion barrier layer directly adjoining the membrane layer comprises a metal carbonitride.

24. The composite membrane according to claim 23, wherein the metal carbonitride comprises at least one metal selected from the group consisting of vanadium, niobium, tantalum, chromium, molybdenum and tungsten.

25. The composite membrane according to claim 24, wherein the single layer of the diffusion barrier layer directly adjoining the membrane layer comprises titanium carbonitride (TiCN).

26. The composite membrane according to claim 24, wherein the single layer of the diffusion barrier layer directly adjoining the membrane layer comprises niobium carbonitride.

27. The composite membrane according to claim 26, wherein the niobium carbonitride comprises $NbC_{0.3}N_{0.7}$.

28. The composite membrane according to claim 1, wherein the single layer of the diffusion barrier layer directly adjoining the membrane layer comprises a metal boride.

29. The composite membrane according to claim 28, wherein the metal boride comprises at least one metal selected from the group consisting of niobium, titanium, zirconium, cerium and barium.

30. The composite membrane according to claim 29, wherein the single layer of the diffusion barrier layer directly adjoining the membrane layer is selected from the group consisting of $CeB_6$, $TiB_2$, NbB, and $NbB_2$.

31. The composite membrane according to claim 1, wherein the substrate comprises metal fibers, wherein interstices between the metal fibers have a width and a length respectively of<about 5 $\mu$m or free hole surfaces between the metal fibers have a round surface equivalent with a diameter of<about 5 $\mu$m.

32. The composite membrane according to claim 31, wherein the interstices or open pores on a side of the substrate facing the at least one diffusion barrier layer are at least partially filled with particles which are sintered with the metal fibers, wherein the particles are selected from the group consisting of metal particles and mixtures of metal particles with ceramic particles and/or glass particles.

33. The composite membrane according to claim 1, wherein the substrate comprises a foil of sintered metal powder.

34. The composite membrane according to claim 33, wherein the foil of sintered metal powder has open pores on a side of the substrate facing the at least one diffusion barrier layer and the open pores are at least partially filled with particles which are sintered with the foil, wherein the particles are selected from the group consisting of metal particles and mixtures of metal particles with ceramic particles and/or glass particles.

35. The composite membrane according to claim 1, wherein at least the single layer of the diffusion barrier layer directly adjoining the membrane layer has an open porosity with a pore diameter of about 20 nm to 500 nm.

36. The composite membrane according to claim 1, wherein at least the single layer of the diffusion barrier layer directly adjoining the membrane layer has microcracks, wherein the microcracks have a width of<about 5 $\mu$m.

37. The composite membrane according to claim 1, wherein at least the single layer of the diffusion barrier layer directly adjoining the membrane layer is formed by physical vapor phase deposition (PVD).

38. The composite membrane according to claim 37, wherein the physical vapor phase deposition is cathode sputtering.

39. The composite membrane according to claim 1, wherein the single layer of the diffusion barrier layer directly adjoining the membrane layer is formed by chemical vapor phase deposition (CVD).

40. The composite membrane according to claim 1, wherein at least the single layer of the diffusion barrier layer directly adjoining the membrane layer is formed by a sol-gel process.

41. The composite membrane according to claim 1, wherein at least the single layer of the diffusion barrier layer directly adjoining the membrane layer is formed from particles with a mean particle size<about 0.5 $\mu$m, which are sintered together.

42. The composite membrane according to claim 1, wherein the single layer of the diffusion barrier layer directly adjoining the membrane layer has a thickness in a range of about 0.1 $\mu$m to 5 $\mu$m.

43. The composite membrane according to claim 1, wherein the diffusion barrier layer is covered on the surface facing away from the substrate with a seed layer whose chemical composition at least paxtiaily corresponds to a composition of the membrane layer.

44. The composite membrane according to claim 1, wherein the at least one membrane layer comprises a metal selected from the group consisting of palladium and palladium alloys.

45. The composite membrane according to claim 1, wherein the at least one membrane layer has a thickness in a range of about 0.5 $\mu$m to 15 $\mu$m.

46. The composite membrane according to claim 1, wherein the at least one membrane layer is covered on its surface facing away from the diffusion barrier layer with catalytically active material.

47. The composite membrane according to claim 46, wherein the catalytically active material is selected from the group consisting of platinum, ruthenium and rhodium.

48. The composite membrane according to claim 46, wherein the catalytically active material is selected from the group consisting of a platinum-palladium alloy, a ruthenium-palladium alloy, a rhodium-palladium alloy, and a palladium-rare earth metal alloy.

49. A process for production of a composite membrane according to claim 1, comprising forming at least the single layer of the diffusion barrier layer directly adjoining the membrane layer by a method selected from the group consisting of PVD, CVD, a sol-gel process, and sintering-on of powder particles with a mean particle size of<about 0.5 $\mu$m, and then electrodepositing the at least one membrane layer on the surface of the diffusion barrier layer facing away from the substrate.

50. The process according to claim 49, further comprising the step of, prior to the electrodepositing step, covering the surface of the diffusion barrier layer facing away from the substrate with a seed layer whose chemical composition at least partially corresponds to that of the membrane layer.

\* \* \* \* \*